Patented Feb. 25, 1941

2,232,728

UNITED STATES PATENT OFFICE 2,232,728

METHOD AND COMPOSITION FOR DISPELLING VAPORS

Clellan Ross Pleasants, San Francisco, Calif.

No Drawing. Application November 15, 1937, Serial No. 174,666. In Canada November 4, 1937

4 Claims. (Cl. 252—1)

This invention relates to a method of and composition for dispelling vapors and especially for dispelling fog and mist from the air, and also to a method of making the composition.

This application is a continuation in part of my copending application for Compound and method for vapor clearing, Serial Number 721,969, filed April 23, 1934.

The invention is predicated on the discovery that upon dispersion of an enormous number of particles of exceedingly fine size in proper distribution into the vapor-laden air, the vapor will gradually disappear. The invention, therefore, may be of particular use for shipping on the high seas and along the coast as well as for inland traffic on roads and tracks—particularly, however, in connection with aerial traffic when the territory over which the airplane or other vehicle flies is hidden by a blanket of fog.

The theoretical explanation of this phenomenon has not been sufficiently ascertained. There is a possibility that owing to the distribution of certain elements or compounds presented in extremely small sized particles, the static conditions of the air may be altered whereby through the flow of electrons or static discharges the vapor is caused to disappear by condensation or it may also be that the compounds, owing to their hygroscopic properties present enormous surface to the action of the innumerable droplets of moisture and avidly adsorb a great proportion of this moisture, thereby clearing the air.

Assuming the latter theory to be more easily accessible to verification by tests, the invention has the object of dispelling into fog or vapor-laden air hygroscopic particles of practically colloidal size in great numbers, the hygroscopic action being primarily a surface action. The hygroscopic compounds or elements present for reaction with the moisture of the air a far greater surface than if the same mass of some compounds would be presented to the vapors in bulk form or in the form of larger grains.

The invention, therefore, also may be described as having the object of converting hygroscopic substances whether in gaseous, liquid or solid form—into particles of colloidal size and dispelling them in this form into the air.

It also may be described to be an object of the invention to aid this conversion of the hygroscopic products to colloidal size by combining with the discharge of the colloidal size into the air a discharge of carriers for these colloidal particles, the carriers themselves also being practically of colloidal and particularly of amorphous form.

In connection with this object of supporting hygroscopic products in colloidal form on carriers, it is also an object of the invention to aid in this carriage or support of the hygroscopic products by the carriers by rendering the carriers of such nature that an adsorption of the hygroscopic products on the surface of these minute carriers may instantly be produced. This adsorption can be effected not only with hygroscopic products which are themselves solids but hygroscopic gases, as for instance, chlorine or hygroscopic liquids. Also for instance sulphuric acid, may be adsorbed rapidly by these carriers, and when then presented in this minute form in an enormous number spread over a relatively large area, the hygroscopic action will result in the absorption of the moisture from the air by the hygroscopic coatings of these carriers. It also has been discovered that the adsorptive efficiency of these carriers is greatest when at the instant of the production of these carriers in colloidal form the hygroscopic products are presented to them for combination by adsorption and the invention, therefore, may also be described as having the object of producing colloidal particles having adsorptive qualities for hygroscopic products, combining these adsorptive particles at the instant of their production with the hygroscopic products and dispelling the coated particles or carriers into the air.

The hygroscopic qualities of certain gases in their form as elements or as chemical compounds are well known, and tests have demonstrated that the elements of the halogen group, particularly however, chlorine in gas form—is particularly suitable as a means for absorbing rapidly moisture from the air. While the blowing of chlorine gas into fog-laden air might eventually cause the dissipation of the fog, it is believed that in this form the use of chlorine would seem to meet too many difficulties and disadvantages in its application. But when the gas is suddenly presented for reaction with the moisture of the atmosphere by being presented as an extremely thin film spread over a very great number of extremely small particles adapted to flow through the air even though the specific weight of these particles may be much greater than that of air, the disadvantages and defects which otherwise would be presented upon the use of chlorine will disappear.

As a hygroscopic product in liquid form, sulphuric acid may be mentioned, in which case the acid may either be sprayed in the form of very fine droplets to combine by absorption with colloidal particles acting as carriers for the sulphuric acid, or vapor droplets of the sulphuric acid may be caused to condense on these carriers by adsorption and also thereby present a greatly enlarged surface for hygroscopic withdrawal of moisture from the air.

Of the solid hygroscopic products in general use, chloride of lime may be mentioned as one of the best known products, and this chloride of lime in the form of extremely fine particles, as for instance in the form of an impalpable powder, may be distributed over particles ready to adsorb the chloride of lime—said last named adsorbent particles also preferably being of colloidal size or the size of palpable powder, flakes and the like.

Of the carriers which by practical tests have been found of great value, carbon particles may be mentioned primarily as avid adsorbers for hygroscopic products. These carbon particles of colloidal size, as for instance, lamp-soot, may be presented to the hygroscopic product while they are in loose condition, and a mechanical intermixture between the carrier particles and the hygroscopic products may be brought about through agitation of the ingredients of the mixture. It is, however, preferable to produce the carrier particles in the form of colloidal carbon particles by imperfectly burning carbonaceous material, as for instance, hydrocarbons, and applying the hygroscopic products to these carbon particles resulting from the combustion at the very time at which said carbon particles are produced.

While in the group of halogen elements chlorine has been mentioned, tests have shown that other elements in this group, as bromine and iodine are fitted for the production of the new mixture of carriers and fog dispelling compounds.

While chloride of lime has been mentioned as one of the solid products suitable for this purpose, it has been discovered that different alkaline or alkaline earth metal compounds may be used, among which may be mentioned the halogen compounds of the alkali metals, lithium, sodium, potassium, rubidium and cesium and the halogen compounds of the alkali earth metals, calcium, magnesium, strontium and barium.

Various methods of applying the coated adsorbent particles of carriers to the air will suggest themselves. In addition to the mechanical intermixture of the colloidal carrier particles with the hygroscopic or fog dispelling products, whether in gaseous, liquid or solid form, it is feasible to saturate a liquid hydrocarbon with a fog dispelling product of this character, and then incompletely burn the mixture, in which case through the very act of combustion, the carbon particles produced by the same will simultaneously present the coating of fog dispelling product.

It is also feasible to spray the hygroscopic product, if it is in solid form or in liquid form, into the fumes or gases arising from the combustion of the fuel or to inspissate a gaseous mixture having fog dispelling qualities into these gases or fumes resulting from the combustion. It is obvious, furthermore, that a gas may also be blown against the carbon particles resulting from the combustion immediately after they have been formed.

The incomplete combustion of hydrocarbons and other fuel, but especially of fuel oil or of turpentine or even of certain combustible gases results in the production of great quantities of soot which in itself is an agglomeration of amorphous carbon particles of colloidal size. Any fuel, therefore, which will upon combustion produce carbon particles of colloidal amorphous size and particularly carbon particles with relatively numerous pores, will lend itself preeminently as a support on which the hygroscopic products may be deposited and retained by adsorption. The combination of the hygroscopic or fog dispelling products with the carrier particles may be brought about under pressure in order to prevent the packing together of the dustlike particles which serve as carriers for the products.

It is, furthermore, obvious that the distribution of the combined carriers and fog dispelling products through the air may be effected in various ways depending upon the purpose for which it is to be used. When applied on the landing field, as for instance, upon a heavy ground fog overwhelming or blanketing the territory, the mass may be discharged under great pressure into the air from motors or the like and may then be permitted to gradually return from its floating condition above the fog to the earth where it will combine with the vapor so as to clear the air. It is also feasible to suspend charges of the mass from balloons which may rise above the ground in order to release their charge after they have reached a selected predetermined height above the ground, in which case also owing to the presence of the mass in an enormous number of colloidal particles, the mass while returning to the earth will gradually spread over a relatively large area, and in floating down to the ground will again free the fog of its moisture contents. It is, furthermore, feasible to release the mass from an aerial vehicle when the pilot believes to be close to the landing field which is covered by the fog—in which case the mass may be suspended from small parachutes which in gradually floating down will open and will also release the mass from its container, so that the descent of the aerial vehicle may be preceded by the clearance of the territory of the fog.

In parts of the country in which travel on highways is impeded by heavy blankets of fog at certain seasons of the year, trucks adapted to disperse continuously during their travel the combined carriers and fog dispelling products may cruise over the territory in which these fogs prevail and thereby clear the air until the heat of the sun raises the temperature of the air above the dewpoint thereof.

While the production of the fog dispelling substance as described above, is based on combustion or on the production of the carbonaceous carrier particles, and immediate application of the hygroscopic substance, it is also feasible to take plain coal dust and mix it with suitably pulverized chloride of lime and to heat this mixture in a closed receptacle. The tests have shown that upon opening the receptacle after the mixture has been heated, the fumes developed from the mixture are active as fog dispelling agents while the solid residue also constitutes a very active powdered agent for the same purpose and which also can be used in the manner described above.

Attention may also be called to the fact that the product of this process can be employed as described above not only for dispelling fog but also for counteracting or rather preventing the detrimental influence of frost on vegetation, as for instance in orchards and the like.

Numerous other examples of the application of this method of dissipating fog or eliminating other water vapors will suggest themselves for use in dependence upon the locations.

Having now particularly described and ascertained the nature of my said invention and in what manner the same is to be performed, I declare that what I claim is:

1. The method of dispelling fogs which comprises dispersing in the atmosphere finely divided particles of amorphous carbon coated with a hygroscopic agent, the coated particles being of such size and specific gravity as to spread over a relatively large area when dispersed in the atmosphere.

2. The method of dispelling fogs which comprises dispersing in the atmosphere finely divided particles of amorphous carbon coated with chloride of lime, the coated particles being of such size and specific gravity as to spread over a relatively large area when dispersed in the atmosphere.

3. A fog dispelling product comprising finely divided particles of amorphous carbon coated with a hygroscopic agent, the coated particles being of such size and specific gravity as to spread over a relatively large area when dispersed in the atmosphere.

4. A fog dispelling product comprising finely divided particles of amorphous carbon coated with chloride of lime, the coated particles being of such size and specific gravity as to spread over a relatively large area when dispersed in the atmosphere.

CLELLAN ROSS PLEASANTS.